United States Patent [19]

Samejima et al.

[11] Patent Number: 4,882,898
[45] Date of Patent: Nov. 28, 1989

[54] CONNECTING LINK STRUCTURE FOR A LAWN MOWER

[75] Inventors: Kazuo Samejima; Hironori Tsuchihashi; Tsuyoshi Sato; Toshihiko Hamada; Hideo Kida; Kiyoto Kasamatsu, all of Sakai, Japan

[73] Assignee: Kubota, Ltd., Osaka, Japan

[21] Appl. No.: 335,912

[22] Filed: Apr. 10, 1989

[30] Foreign Application Priority Data

Jul. 20, 1988 [JP] Japan .................. 63-180605

[51] Int. Cl.⁴ ............................................. A01D 34/54
[52] U.S. Cl. .................. 56/208; 56/DIG. 22
[58] Field of Search .................. 56/208–214, 56/DIG. 22; 180/41

[56] References Cited

U.S. PATENT DOCUMENTS 3,402,536  9/1968  Hale et al. .................. 56/209 X
3,611,682 10/1971  Isaacson et al. .......... 56/DIG. 22 X
3,706,186 12/1972  Hurlburt et al. .......... 56/DIG. 22 X
4,577,455  3/1986  Amano et al. ............. 56/DIG. 22 X
4,707,972 11/1987  Forpahl et al. ............ 56/209 X Primary Examiner—Thuy M. Bui
Attorney, Agent, or Firm—Jordan and Hamburg

[57] ABSTRACT

A connecting link structure for connecting a grass cutting unit to a position between front and rear wheels of a riding type lawn mower. The link structure comprises parallel front links and parallel rear links each pivotally connected at one end thereof to a vehicle body and at the other end to the grass cutting unit. A curved bracing auxiliary link extends from the pivotal connection between the vehicle body and one of the rear links, along this rear link, and then perpendicular to the other rear link to be secured to the other rear link at a point offset from the pivotal connection between the other rear link and the grass cutting unit.

7 Claims, 4 Drawing Sheets

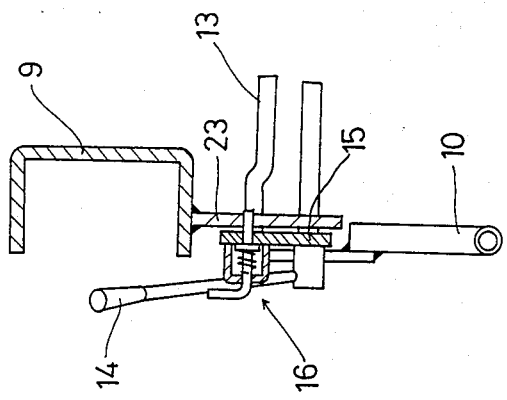
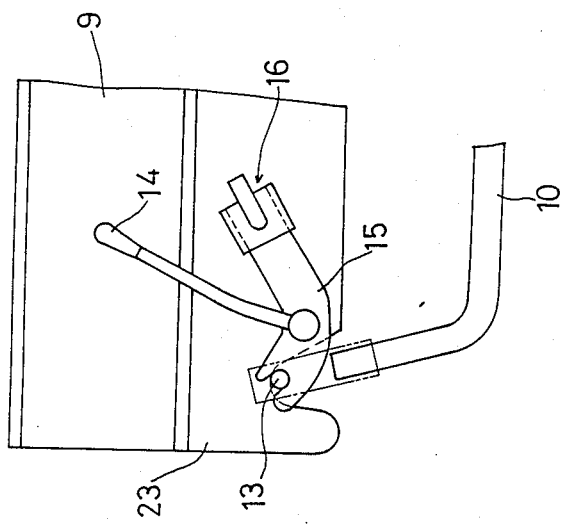

CONNECTING LINK STRUCTURE FOR A LAWN MOWER

BACKGROUND OF THE INVENTION

The present invention relates to a connecting link structure for a lawn mower, which structure includes a pair of left and right links for pivotally connecting a grass cutting unit to a vehicle body, and a bracing auxiliary link extending between the left and right links.

In a known connecting link structure of the type noted above, the auxiliary link is welded at one end thereof to a position adjacent an end of one of the left and right links connected to the vehicle body, and fixed at the other end thereof to an end of the other link connected to the grass cutting unit. Thus, the auxiliary link is fixed to the left and right connecting links to form an integral construction.

Since in the known structure the two connecting links and the bracing auxiliary link are integrated, the entire link structure must be lifted when the grass cutting unit is attached to or detached from the vehicle body. This structure, therefore, has the disadvantage of placing a great burden of weight on the operator. Further, since the left and right links are integrated, stress could concentrate on one position when the grass cutting unit tilts sideways relative to the vehicle body. It is thus necessary to provide extra strength for the connections of the links.

SUMMARY OF THE INVENTION

The object of the the present invention is to provide a connecting link structure having sufficient strength and allowing the grass cutting unit to be attached to and detached from the vehicle body with ease.

In order to achieve this object, a connecting link structure according to the present invention comprises first and second link means each pivotally connected at one end thereof to the vehicle body and at the other end thereof to the grass cutting unit, and a bracing auxiliary link disposed between the first and second link means, the auxiliary link being secured at one end thereof to a pivotal axis region of the first link means adjacent the grass cutting unit and connected at the other end thereof to a pivotal axis of the second link means adjacent the vehicle body.

In the above structure, the auxiliary link is fixed to only one of the link means. Therefore, when attaching or detaching the grass cutting unit to/from the vehicle body, the operator may lift each of the link means separately, which results in a reduced weight acting on the operator at a time. Further, since each link means is pivotable on a pivotal axis, the link means readily follows sideways tilts of the grass cutting unit relative to the vehicle body, thereby eliminating the possibility of excessive forces acting thereon.

Consequently, the connecting link structure according to the present invention has a simple construction without necessitating increased strength at the connecting positions of the link means. This structure facilitates attachment and detachment of the grass cutting unit, and effectively braces the connecting links.

The foregoing and other objects, features and advantages of the invention will be apparent from the following more particular description of preferred embodiments of the invention, as illustrated in the accompanying drawings.

BRIEF DESCRIPTION OF THE DRAWINGS

The drawings show connecting link structures according to the present invention, in which:

FIG. 4 is a fragmentary side view of a front link connection, FIG. 5 is a sectional rear view of the front link connection.

DESCRIPTION OF THE PREFERRED EMBODIMENT

An embodiment of the present invention will be described hereinafter with reference to the drawings.

Figure 1:
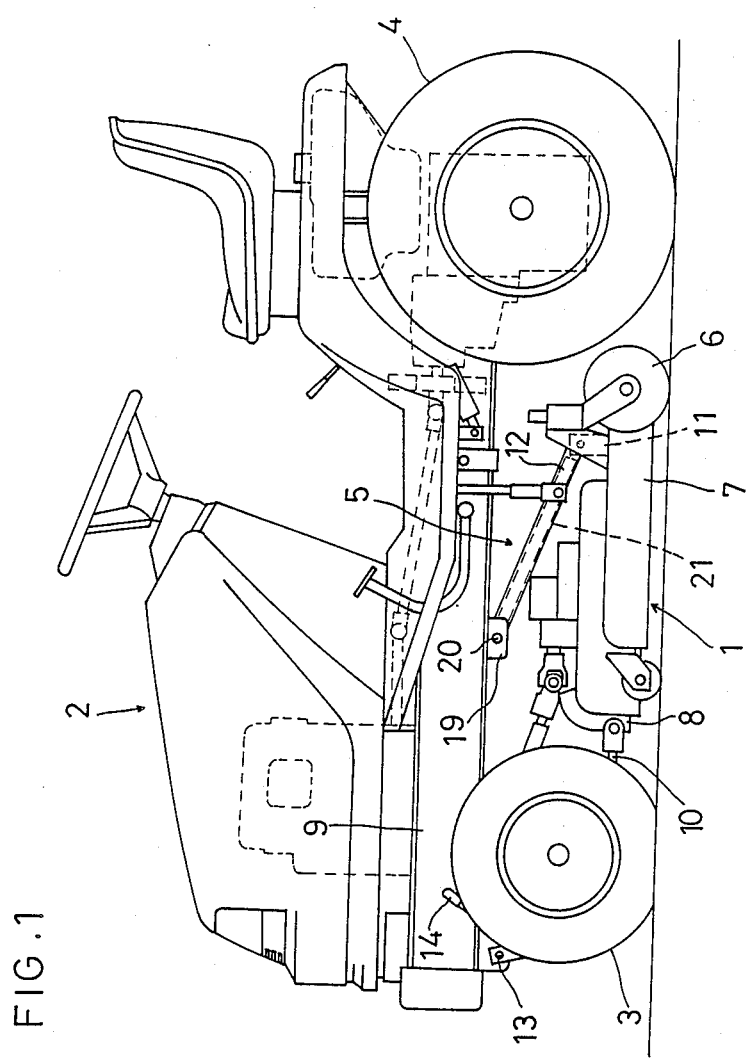
FIG. 1 is a side elevation of a riding type lawn mower.

FIG. 1 shows a riding type lawn mower equipped with a grass cutting unit 1 according to the present invention.

This lawn mower comprises a vehicle body 2 supported by front wheels 3 and rear wheels 4. The cutting unit 1 is vertically removably connected in an undersling fashion to an undersurface of the vehicle body 2 through a parallelogram link mechanism 5. The cutting unit 1 is also supported by freely rotatable ground wheels 6, 6'.

Figure 2:
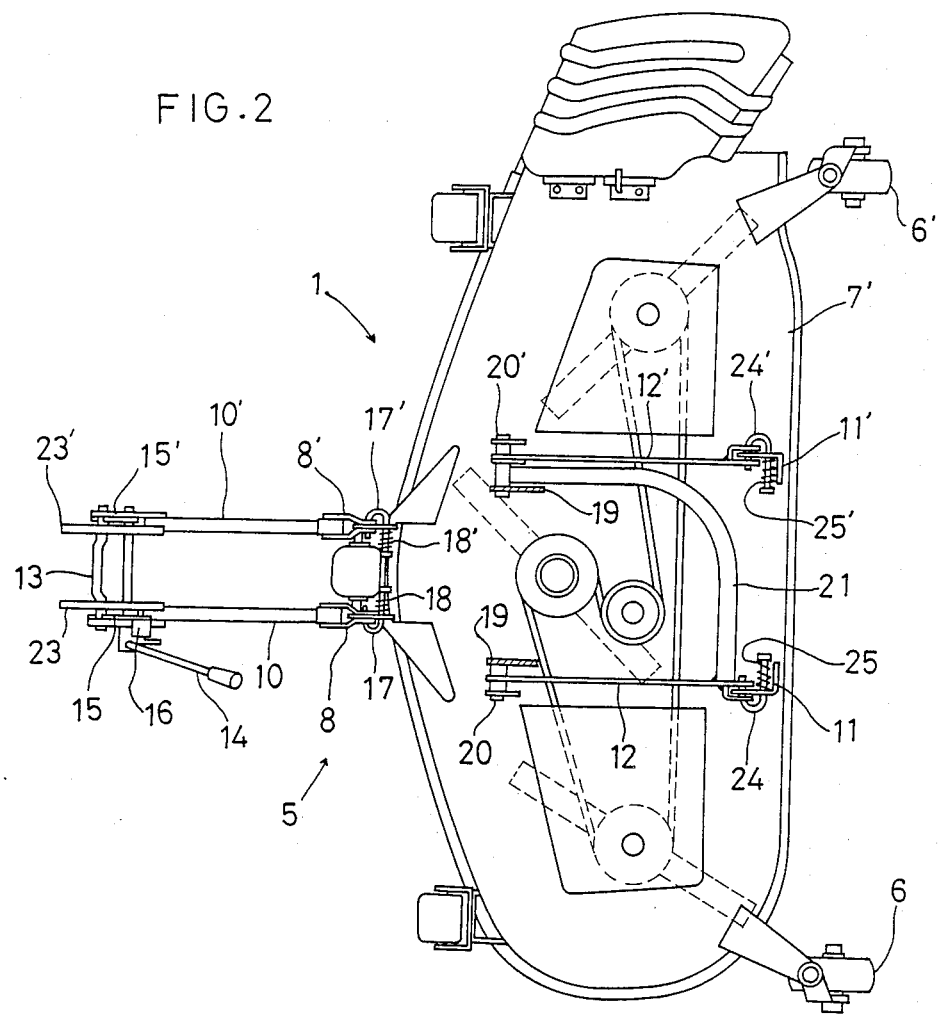
FIG. 2 is a plan view, partly in section, of a grass cutting unit and a connecting link structure.

As also shown in FIG. 2, the cutting unit 1 includes a blade housing 7 carrying a pair of left and right brackets 8, 8' at a forward end thereof and a pair of left and right brackets 11, 11' at rearward positions on a top surface thereof. The blade housing 7 is pivotally connected to front positions of frames 9 of the vehicle body 2 through a pair of left and right front links 10, 10' extending from the brackets 8, 8', and to rearward positions of the frames 9 through a pair of left and right rear links 12, 12' extending from the brackets 11, 11'. The front links 10, 10' and rear links 12, 12' constitute the parallelogram link mechanism 5.

More particularly, the front links 10, 10' are rigidly interconnected through a grip 13 to form an U-shaped structure in plan view. Thus the cutting unit 1 may be attached to and detected from the vehicle body 1 efficiently with the front links 10, 10' remaining inseparable. As shown in FIGS. 4 and 5, the frames 9 carry brackets 23, 23' at the front positions thereof. The brackets 23, 23' support hooks 15, 15' operable by a rockable control lever 14 for engaging and pivotally connecting forward ends of the front links 10, 10' to the brackets 23, 23'. This construction provides a lock mechanism 16 for automatically locking the hooks, 15, 15' in an engaging position. The front links 10, 10' are pivotally connected at rearward ends thereof to the brackets 8, 8' by U-shaped pins 17, 17' urged by springs 18, 18 to positions extending through the brackets 8, 8'. Thus the front links 10, 10' are readily connectable to and disconnectable from the brackets 8, 8' only be pulling the pins 17, 17'.

Figure 3:
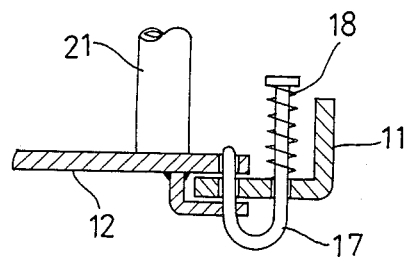
FIG. 3 is a fragmentary plan view of a rear link connection.

The rear links 12, 12' are connected to the frames 9 through pivot pins 20, 20' manually attachable to and detachable from brackets 19, 19' secured to the frames 9. On the other hand, the rear links 12, 12' are connected to the blade housing 7 in the same way as the front links 10, 10' are connected thereto, i.e. through pins 24, 24' urged by springs 25, 25' to engaging positions as shown in FIG. 3. Thus the rear links 12, 12' are readily disconnectable only by pulling the pins 24, 24' against the urging force of springs 25, 25'.

An auxiliary link 21 is disposed between the left and right rear links 12, 12' for preventing sideways swings of the cutting unit 1. The auxiliary link 21 comprises a round bar or pipe bent into an approximately L-shaped shape in plan view, with a rear end thereof secured to the end of the lefthand rear link 12 connected to the blade housing 7. More particularly, a front part of the auxiliary link 21 extends substantially parallel to the righthand rear link 12', while a rear part thereof extends perpendicular to the lefthand rear link 12, with a transitional part from the front part to the rear part having an arcuate shape.

The auxiliary link 21 is secured to the lefthand rear link 12 at a point offset by a predetermined amount from the pivotal connection between the lefthand rear link 12 and the blade housing 7. The front end of the auxiliary link 21 is pivotally connected to the vehicle body 2 through the pivot pin 20' acting also as the pivotal axis of the righthand rear link 12'. According to this construction, the auxiliary link 21 is pivotable in unison with the lefthand rear link 12, and is vertically movable independently of the righthand rear link 12'. Thus, the two rear links 12, 12' are vertically movable independently of each other when the blade housing 7 tilts sideways, which is effective to avoid excessive forces acting on the connecting points of the rear links 12, 12'. Furthermore, when attaching the cutting unit 1 to the vehicle body 2, the rear links 12, 12' may be connected in separate steps of operation, which relieves the operator from a heavy burden of weight.

Figure 6:
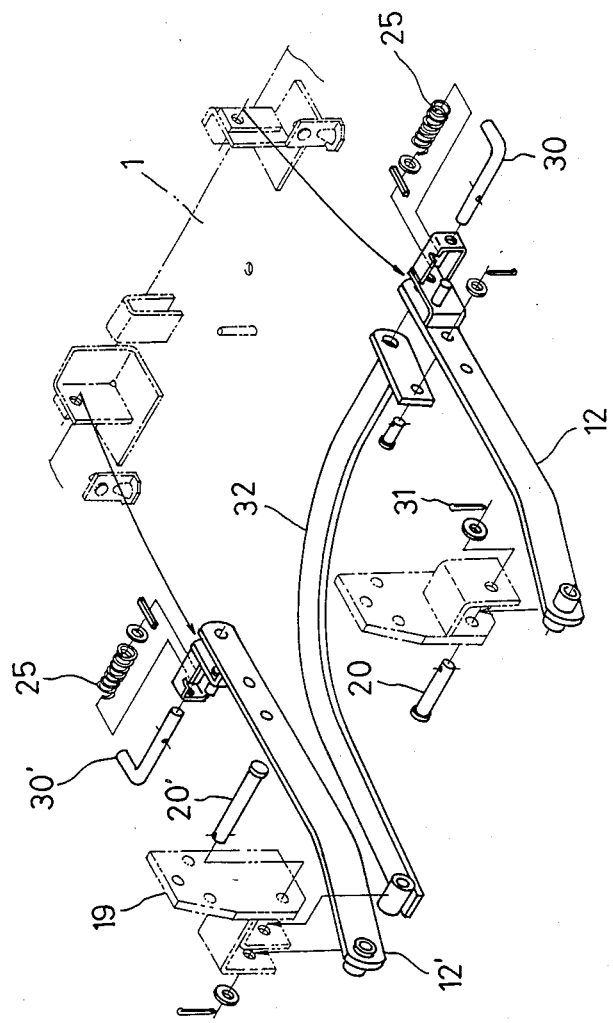
FIG. 6 is an exploded perspective view of a modified connecting link structure.

FIG. 6 shows a modified connecting link structure, which differs from the foregoing embodiment in that an auxiliary link 32 is formed of a flat strip and connected at the rear end thereof to the lefthand rear link 12 by a pin 31. This modified structure further includes an L-shaped pin 30 for pivotally connecting the lefthand rear link 12 to the blade housing 7.

This structure permits the rear links 12, 12' and auxiliary link 32 to be separated from one another, thereby further reducing the burden of weight at a time of assembly.

What is claimed is:

1. A connecting link structure for connecting a grass cutting unit to a vehicle body, comprising first and second link means each pivotally connected at one end thereof to said vehicle body and at the other end thereof to said grass cutting unit, and a bracing auxiliary link disposed between said first and second link means, said auxiliary link being secured at one end thereof to a pivotal axis region of the first link means adjacent said grass cutting unit and connected at the other end thereof to a pivotal axis of the second link means adjacent the vehicle body.

2. A connecting link structure as claimed in claim 1, wherein said first and second link means extend parallel to each other, and said auxiliary link has a forward part thereof extending substantially parallel to said second link means, and a rearward part thereof extending perpendicular to said first link means, with a transitional intermediate part between the forward and rearward parts having an arcuate shape.

3. A connecting link structure as claimed in claim 2, wherein said auxiliary link is secured to said second link means at a point offset by a predetermined amount from a pivotal connection between said second link means and said grass cutting unit.

4. A connecting link structure as claimed in claim 2, further comprising a cylinder connected to the first and/or second link means for vertically moving said grass cutting unit.

5. A connecting link structure as claimed in claim 4, wherein the first and second link means are pivotally connected to said grass cutting unit through removable pins.

6. In a riding type lawn mower having a grass cutting unit connected through a connecting link structure to a position between front and rear wheels, said connecting link structure comprising;
    first and second rear link means each pivotally connected at one end thereof to a vehicle body and at the other end thereof to a rearward position of said grass cutting unit,
    a bracing auxiliary link disposed between said first and second rear link means, said auxiliary link being secured at one end thereof to a pivotal axis region of the first rear link means adjacent said grass cutting unit and connected at the other end thereof to a pivotal axis of the second rear link means adjacent the vehicle body, and
    first and second front link means each pivotally connected at one end thereof to said vehicle body and at the other end thereof to a forward position of said grass cutting unit, said first and second front link means including self-locking means for pivotal connection thereof to said vehicle body.

7. A riding type lawn mower as claimed in claim 6, wherein the first and second front and rear link means are pivotally connected to said grass cutting unit through removable pins.

* * * * *